G. J. SMITH.
VEHICLE TRAILER.
APPLICATION FILED JULY 1, 1918.
1,321,946. Patented Nov. 18, 1919.
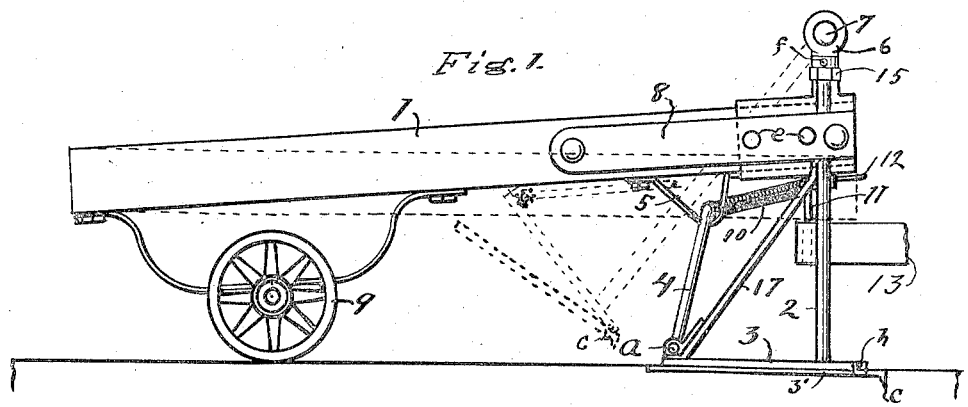
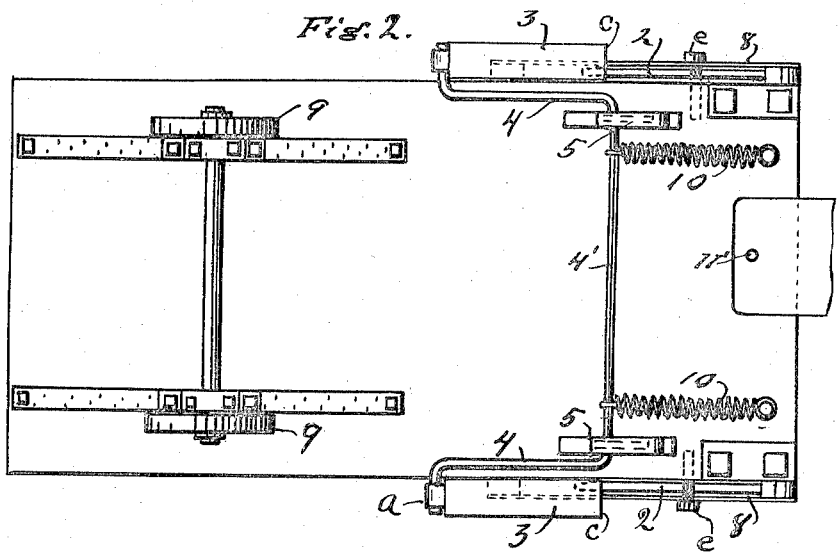
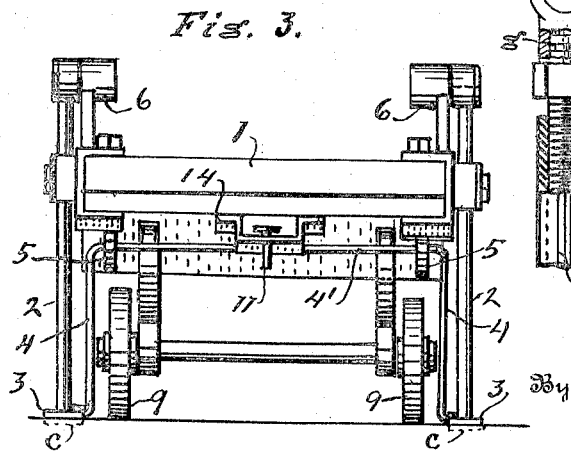
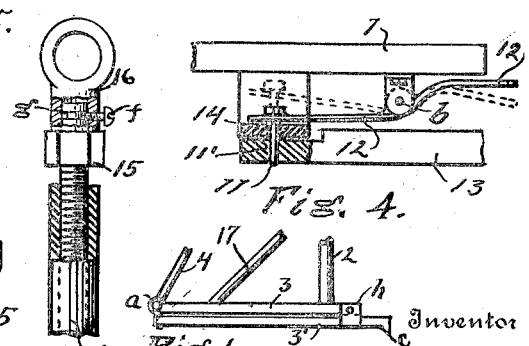
Inventor
George J. Smith
By Ichiel J. Willey
Attorney

UNITED STATES PATENT OFFICE.

GEORGE J. SMITH, OF GRAND RAPIDS, MICHIGAN, ASSIGNOR OF ONE-HALF TO JAY A. MUTTON AND WILFRED B. KITCHEN, BOTH OF GRAND RAPIDS, MICHIGAN.

VEHICLE-TRAILER.

1,321,946.  Specification of Letters Patent.  Patented Nov. 18, 1919.

Application filed July 1, 1918. Serial No. 242,960.

*To all whom it may concern:*

Be it known that I, GEORGE J. SMITH, a citizen of the United States, residing at Grand Rapids, in the county of Kent and State of Michigan, have invented certain new and useful Improvements in Vehicle-Trailers, of which the following is a specification.

My invention relates to improvements in vehicle trailers for use with power tractors, and its objects are: first, to provide for elevating one end of the trailer for unloading, by backing the tractor against the trailer. Second, to provide for lowering the end of the trailer and coupling it with the tractor by the forward movement of the tractor. Third, to provide for varying the height to which the end of the trailer may be elevated, and, fourth, to provide a means whereby the king bolt may be raised or lowered independently of the raising and lowering of the end of the trailer.

I attain these objects by the mechanism illustrated in the accompanying drawing, in which Figure 1 is a side elevation of the trailer with the front end elevated. Fig. 2 is a bottom plan of the trailer body. Fig. 3 is a front end elevation of the trailer elevated. Fig. 4 is a sectional detail showing the independent actuating device. Fig. 5 is a detailed elevation of the upper end of the supporting standards showing the manner of adjusting them longitudinally, and, Fig. 6 shows the manner of attaching an auxiliary shoe.

Similar reference characters indicate similar parts throughout the several views.

The elevating and lowering device consists of a vertically adjustable standard 2, at each side of the trailer, pivotally connected with the upper ends of the standards 6, as at 7. The standards 2 have oblong shoes 3 secured to their lower ends, and are so mounted upon the body 1 that when supporting the end of the trailer in elevated position the standards are in such position that they cannot be drawn forward and downward by gravity, when the trailer is being loaded or unloaded. I, also, sometimes, pivot an auxiliary shoe 3' to the main shoe, as at h, to facilitate the action of the shoe in very soft soil.

When it is desired to couple a trailer upon a tractor, the coupling end, 13, of the tractor is passed under the front end of the trailer and the king bolt 11 is lowered into the hole 11', when the forward movement of the tractor will draw sufficiently upon the trailer to trip the standards 2 and allow the standard and shoe to assume the positions indicated by their dotted lines in Fig. 1 so that the trailer platform 1 will drop upon the tractor coupling element 13, as indicated by its dotted lines in the same figure, when the trailer will be free to be drawn forward by the tractor, supported upon the tractor coupling element, and the wheels 9, in the usual manner of operating this class of trailers.

For the purpose of steadying and guiding the standards and shoes when operating them I place a pair of adjustable braces, 4, pivotally connected at a, made to operate in the guides 5, and actuated to draw the connecting body 4' into normal position when the standards 2 are forced into upright position, by means of the springs 10, or other suitable actuating elements.

The king bolt may be actuated by means of any available element, as, for instance, the lever 12, pivotally supported at b with one end passed under the head of the king bolt and, normally, resting upon the king bolt support 14.

I prefer that the front ends of the feet or shoes 3 be so formed as to produce a natural bite, as at c, to positively insure their firm engagement into the ground when the trailer is being moved forward to connect it with the tractor.

I place a guard plate 8 upon each side of the body, forming slots between the guard plates and the body for the free movement of the standards 2, and arrange to pass a bolt, as e, through these plates and into the body to act as supports or locks to hold the standards in the desired positions for supporting, or releasing the body 1, as indicated in Fig. 1.

I provide for adjusting the length of the standards 2 by placing a properly applied screw 15 into the upper ends of the standards, provided with properly formed heads so the screws may be readily screwed into the standards to shorten them, or screwed out of the standards to lengthen them, as may be desired. The head of each screw is revolubly mounted in the heads 16 by any available mechanical appliance, as indicated by the groove $g$ and the screw or pin $f$, in Figs. 1 and 5.

In Fig. 6 I have shown the standard 2 and shoe or foot 3 with the braces 4 and 17 arranged differently from those shown in Fig. 1, and have shown the manner of securing the auxiliary foot 13', and by the dotted lines in Fig. 1 I have shown the adaptability of this shoe to various angles in the operation of the standards 2.

What I claim as new in the art, is:

1. In combination with a vehicle trailer, supporting standards pivotally mounted above one end of the trailer, in position to support said end, a shoe attached to the lower ends of each standard and properly braced, a spring actuated guiding brace pivotally connected with one end of each of said shoes, and a locking device connected with the body of the trailer.

2. In a vehicle trailer, a body mounted on two wheels, a standard secured to, and extending upwardly from each side of the body, an auxiliary standard pivotally connected with the upper end of each of the first mentioned standards, a shoe connected with the lower end of each of the auxiliary standards and properly braced therewith, a guide connected with each side of the body and forming a slot for the free movement of the auxiliary standards, all arranged for elevating or lowering the end of the trailer body by moving the trailer backward or forward, and means for locking the standards in desired positions.

3. In combination with a trailer body having two supporting wheels, standards pivotally connected with one end of the body and arranged to elevate and lower the body by the backward or forward movement of a tractor, guideways for the free but proper movement of the standards, locking bolts for holding the standards in desired positions, spring actuated braces pivotally connected with the lower ends of the standards, loops on the body for guiding said braces, and means for actuating a king bolt independently of the raising and lowering of the body.

4. The combination with a trailer body having two supporting wheels, standards pivotally connected with one end of the body and arranged to elevate and lower the body by the backward or forward movement of a tractor, long, narrow shoes supported on the lower ends of the standards and properly braced, and auxiliary shoes pivotally connected with the permanent feet.

5. In combination with a vehicle trailer having two supporting wheels, permanent standards extending upwardly from the front end of the trailer, swinging standards pivoted to the upper ends of the permanent standards, screw actuated extensions connected with the swinging standards, shoes permanently secured to the lower ends of the swinging standards and properly braced, and auxiliary shoes pivotally connected at one end with the front ends of the permanent shoes and extending backwardly and forwardly from the standards.

6. In combination with a vehicle trailer having supporting wheels at the back end, permanent standards extending upwardly from the front end of the trailer, longitudinally adjustable standards pivotally mounted upon the upper ends of the permanent standards and extending downwardly therefrom and terminating in broad, long shoes, adjustable braces pivotally connected with the back ends of said shoes and slidably connected with the body of the trailer, and auxiliary shoes pivotally connected with the front ends of the permanent shoes.

Signed at Grand Rapids, Michigan, June 22, 1918.

GEORGE J. SMITH.